UNITED STATES PATENT OFFICE.

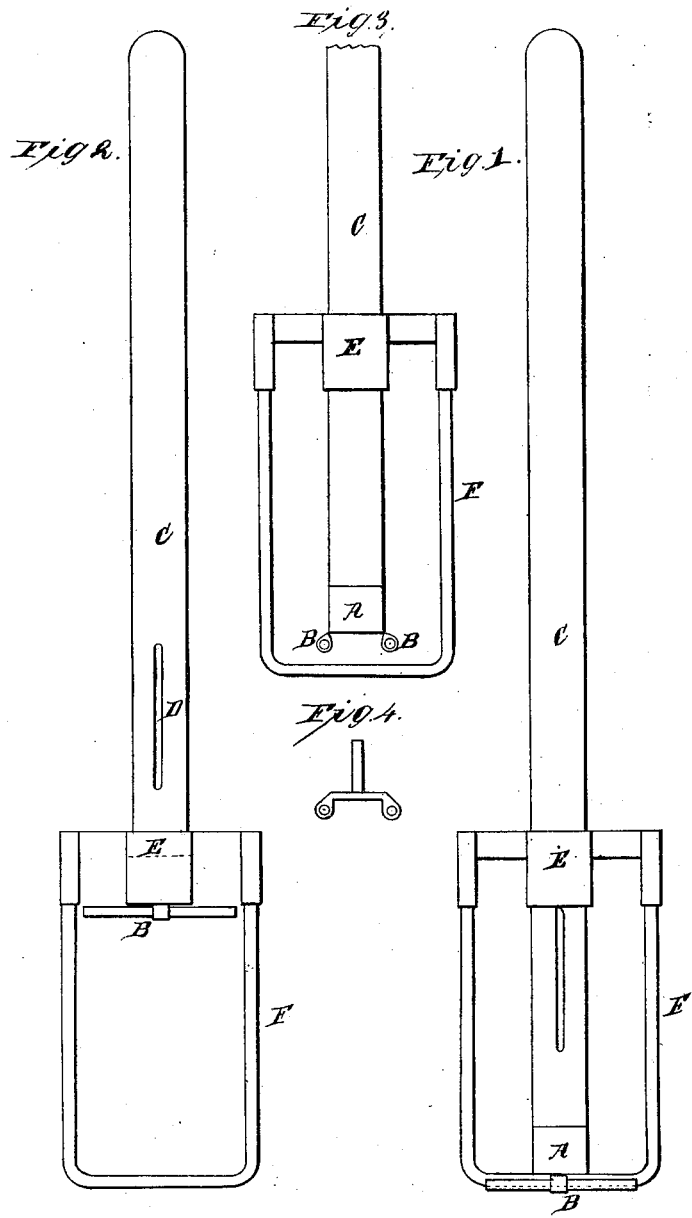

JOEL LEE AND HENRY R. LEE, OF GALESBURG, ILLINOIS, ASSIGNORS TO THEMSELVES AND W. C. CALKINS, OF SAME PLACE.

IMPROVED MOP.

Specification forming part of Letters Patent No. 47,066, dated March 28, 1865.

*To all whom it may concern:*

Be it known that we, JOEL LEE and H. R. LEE, of Galesburg, in the county of Knox and State of Illinois, have invented a new and useful Improvement in Mops; and we do hereby declare that the following is a full, clear, and exact description of the construction and operation of the same, reference being had to the annexed drawings, making a part of this specification, in which—

Figure 1 is a perspective view of mop with handle down, ready for use. Fig. 2 represents the handle up, ready for wringing. Fig. 3 is a sectional view.

The forked ferrule A is formed by a projection from each side to receive the rods B B, and is secured on the end of handle C, which handle is provided with spring D. The head-piece E has a hole in the center to admit the handle to pass through it freely, and a hole at each end to receive the ends of stirrup F. The stirrup is formed by bending the two sides at right angles with the lower end. The middle of lower part is curved upward a little, so as to incline the cloth to slip toward the center when being wrung. The fork may be made separate from the ferrule, as in Fig. 4, and the shank inserted in the end of handle through the ferrule. The ends of the mop-cloth are fastened to rods B B, and the middle is under and outside of stirrup F.

To use this mop, the head-piece E is pulled up the handle until the stirrup hits the end of the handle between the rods B B, and is secured in this position by spring D, the stirrup, passing between the folds of the cloth, is prevented from hitting the floor by rods B B. and is out of the way while using the mop.

To wring the mop-cloth, the spring D is pressed down and the head-piece and stirrup are pushed down as far as the fork will permit, and held firm in this position while the handle is turned, thus wringing the mop-cloth effectually without the necessity of wetting the hands.

What we claim as our invention, and desire to secure by Letters Patent, is—

1. The forked ferrule A and the rods B B, substantially as and for the purpose specified.

2. The handle C, spring D, head-piece E, and stirrup F, in combination with forked ferrule A and rods B B, substantially as and for the purpose specified.

JOEL LEE.
HENRY R. LEE.

Attest:
M. W. GAY,
H. H. WILSON.